United States Patent Office 2,923,154
Patented Feb. 2, 1960

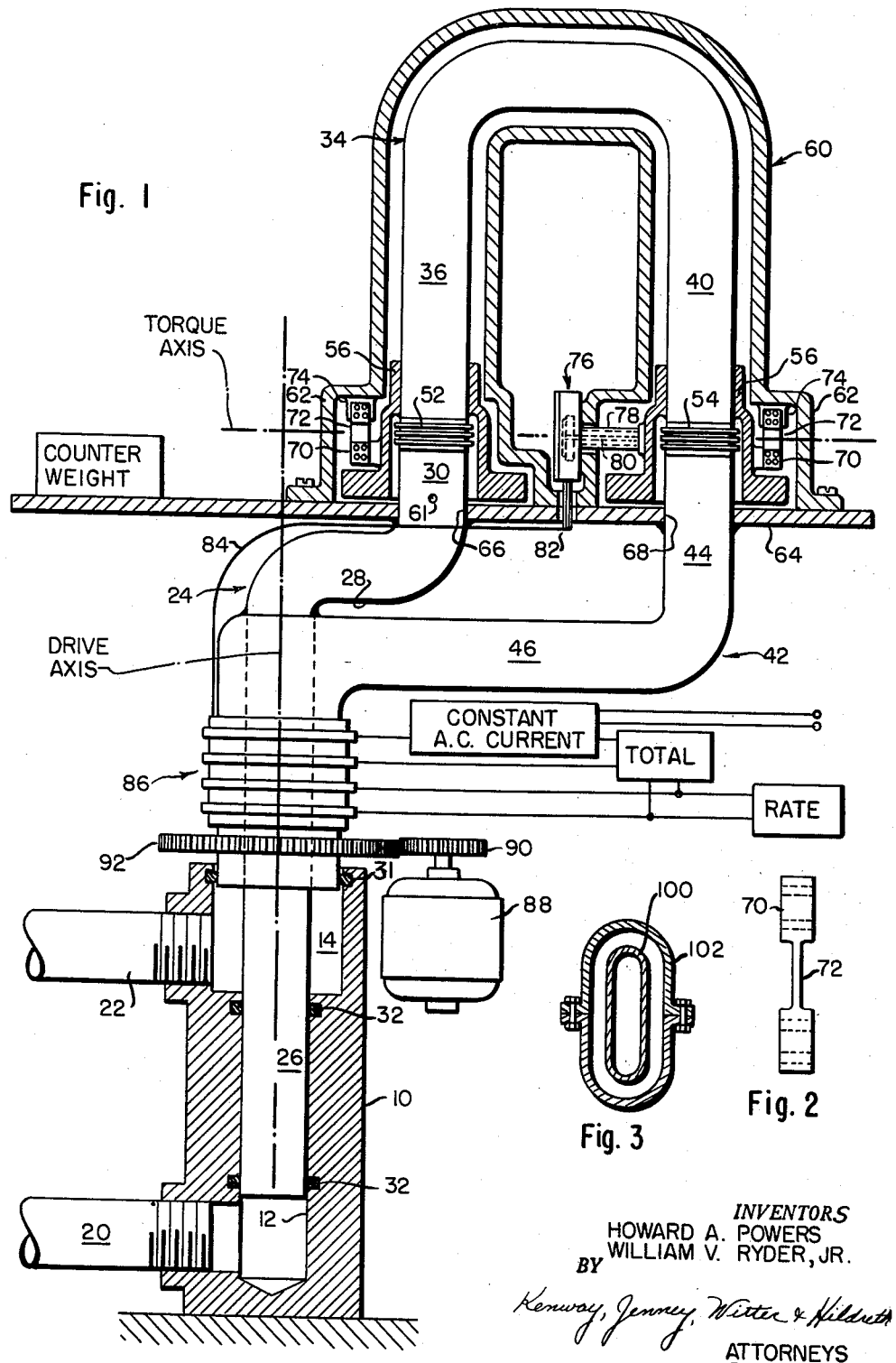

2,923,154

VERTICAL FLOWMETER

Howard A. Powers, Medfield, and William V. Ryder, Jr., Marblehead, Mass., assignors, by mesne assignments, to American Radiator & Standard Sanitary Corporation, New York, N.Y., a corporation of Delaware Application September 27, 1955, Serial No. 536,994

2 Claims. (Cl. 73—194)

This invention relates to flowmeters and comprises a new and improved mass flowmeter operating on gyroscopic principles.

In a gyroscopic flowmeter a fluid the mass rate of flow of which is to be measured, is flowed through a curved conduit which is rotated so that a gyroscopic couple is produced. The system is analagous to a mechanical gyroscope with the flowing fluid corresponding to the spinning flywheel, rotation of which on an axis (drive axis) transverse to the axis in spin yields a torque about a third axis (torque axis) transverse to the other two axes. The gyroscopic couple resulting when the curved conduit is rotated is directly proportional to the mass rate of fluid flow in the conduit and its measurement provides a convenient indication of the mass flow rate.

Gyroscopic flowmeters heretofore developed have been constructed such that the conduit rotates about a substantially horizontal axis. It has thus been necessary to form the conduit so that its total mass, including the fluid within it, is balanced about the torque axis in order to assure a linear response. Otherwise, torques about the torque axis created by imbalance add to or subtract from the gyroscopic couple whenever the torque axis, which rotates as the conduit is rotated, is not vertical. This not only introduces errors in the flow measurement, but also tends to produce uncontrollable oscillations about the torque axis which reduce the effectiveness of the meter.

In the flowmeter of the present invention, the curved or sensing conduit rotates about a vertical axis. The torque axis perpendicular to the rotational or drive axis, is thus caused to swing in a horizontal plane. At rest, the center of gravity of the sensing conduit lies over the torque axis and, therefore, weight of the conduit cannot produce a torque about that axis. In addition, we preferably limit deflection of the sensing conduit about the torque axis to ¼ degree under full flow conditions, so that the gravitational force even at maximum deflection has a negligible moment arm about the torque axis and therefore, produces a negligible torque. Thus by employing a vertical drive axis, it no longer is necessary to provide inherently complicated means for balancing the sensing conduit about the torque axis to avoid gravity sensitivity.

In addition to eliminating gravity sensitivity, our flowmeter incorporates features which make it particularly well suited for the measurement of the flow rates of fluids at extremely high pressure. One specific application which requires the special features to be described presently is the measurement of natural gas which is frequently under pressures of 2000 lbs. per square inch or more. High pressure service is provided by encasing the sensing conduit in a rigid enclosed housing into which the fluid being measured is permitted to enter through an inlet port in the conduit. The sensing conduit, which must be sufficiently flexible to deflect in response to the gyroscopic couple of the fluid being measured, is thus subjected to equal internal and external pressures which makes it unnecessary to construct it to withstand a high pressure differential at the sacrifice of adequate flexibility.

A primary object of this invention is to eliminate gravity sensitivity in gyroscopic mass flowmeters.

A second important object of this invention is to provide mass flowmeters capable of measuring fluids at extremely high pressures.

Another object of this invention is to simplify the construction of gyroscopic mass flowmeters.

Two of the important features of our invention have been described above, i.e., the vertical drive axis and the pressurized housing about the sensing conduit and the bellows. As another important feature, our new and improved flowmeter includes a unitary base having concentric header chambers which direct fluid to and from the sensing conduit. A motor and a slip ring assembly are located immediately adjacent to the base, substantially simplifying the configuration of the instrument.

These and other objects and features of our invention along with incident advantages will be better understood and appreciated from the following description of one embodiment thereof selected for purposes of illustration and shown in the accompanying drawing in which:

Fig. 1 is a view in front elevation, partially in section, of a flowmeter constructed in accordance with our invention, Fig. 2 is a detailed view of a flexure pivot incorporated into the embodiment shown in Fig. 1, and Fig. 3 is a view in cross-section of an alternative configuration of a sensing conduit which may be incorporated into the embodiment illustrated in Fig. 1.

In the preferred embodiment of the invention shown in Fig. 1, a curved sensing conduit 34 disposed about a conduit axis and lying in a generally vertical plane is mounted to be driven about a vertical axis, designated "Drive Axis," flexible connections to it being made through inlet and outlet ducts 24 and 42, which terminate in concentric portions rotatably mounted in a base member 10. Connections to the ducts 24 and 42 are made through concentric header chambers 12 and 14 formed within the base member 10 and accommodating the terminal portions of the ducts 24 and 42, with seals 31 and 32 providing fluid-tight joints. Inlet and outlet pipes 20 and 22 tapped into the base 10 to connect with the header chambers 12 and 14 provide for incorporating the meter in a flow line.

The flexible connections between the ends of the sensing conduit 34 and the inlet and outlet ducts 24 and 42 are made through bellows 52 and 54 which permit the sensing conduit to deflect in response to gyroscopic couples developed in the fluid flowing through it.

The sensing conduit 34 and the inlet and outlet ducts 24 and 42 are arranged to be rotated about the Drive Axis by a constant speed motor 88 which drives the assembly through gears 90 and 92, the latter one being mounted around the concentric inlet and outlet ducts 24 and 42 immediately above the base 10.

From the foregoing it will be seen that when a fluid is flowed through the sensing conduit 34, while the sensing conduit is rotated about the Drive Axis, the angular momentum of the fluid in the path defined by the sensing conduit will result in a gyroscopic couple tending to deflect the sensing conduit about an axis transverse to the Drive Axis and in the plane defined by the sensing conduit. That axis is designated the Torque Axis. Because of the flexible couplings to the sensing conduit 34 provided by the bellows 52 and 54, the sensing conduit is free to deflect in response to the gyroscopic couple to provide a measure of the couple and accordingly of the mass rate of fluid flow.

In the preferred embodiment illustrated, the sensing conduit is displaced radially from the drive axis such that the flow through it is either inwardly or outwardly radially, the inlet and outlet ducts 24 and 42 being extended radially outwardly to permit this type of rotation. By so displacing the sensing conduit 34 from the Drive Axis, a number of advantages are realized. First, since the direction of flow through the sensing conduit is either inwardly or outwardly radially, depending on which direction the fluid is flowed through the meter, fluids containing both heavy inclusions, e.g. solid particles, or light inclusions, e.g. gas bubbles, may be easily handled without tending to trap the inclusions in the sensing conduits, by selecting a direction of flow such that the centrifugal force in the radial portion of the sensing conduit will move the inclusions along with the fluid. Thus, with heavy inclusions, the fluid is desirably introduced through the inner duct 24 to flow radially outward through the sensing conduit 34, that is in the direction in which the heavy particles are centrifugally directed. Conversely, a fluid with light inclusions would advantageously be introduced through the outer duct 42 to flow radially inwardly through the sensing conduit, in the direction in which the light particles or bubbles are centrifugally driven.

In addition, by displacing the sensing conduit 34 from the Drive Axis the length of radial portion of the sensing conduit, in which the entire force producing the torque about the Torque Axis is developed, is accurately fixed between definite inlet and outlet radii so that a truly linear response is assured. If on the other hand, either the inlet or outlet to the sensing conduit were coaxial with the Drive Axis, the fluid passing that point and inclusions carried by the fluid would be a variable distance from the Drive Axis, depending on numerous factors which are avoided by displacing both the inlets and outlets.

Attached to the lower ends of each of the legs 36 and 40 are bell shaped weights 56 which extend downwardly about the bellows 52 and 54. The peripheries of the weights are substantially enlarged to lower the center of gravity of the sensing conduit mass, moving it nearer to the torque axis.

A housing or outer conduit 60 surrounds the sensing conduit and has enlarged ends 62 which cover the bellows 52 and 54 and the weights 56, in addition to other elements. A horizontal plate 64 having a pair of openings 66 and 68 which receive the upper vertical portions 30 and 44 of the inlet and outlet ducts, respectively, is screwed to and closes the ends 62 of the outer conduit 60. The plate 64 is welded to the ducts 24 and 42 about the periphery of the openings 66 and 68 and carries a counter weight which balances the instrument about the drive axis. A port 61 is formed in the upper vertical portion 30 of the duct 24 communicating with the outer conduit 60 and allows fluid entering the meter to fill the annular chamber defined by the outer conduit, the bellows and the sensing conduit 34, and to equalize the pressure between the inside and outside of the sensing conduit.

A flexure pivot 70 having its central portion 72 substantially reduced in cross-section is shown in detail in Fig. 2. A pair of these flexure pivots 70 are employed in the meter at the torque axis to permit limited deflection of the sensing conduit 34. One pivot is positioned parallel to the axis of the bellows in each of the enlarged ends 62 of the outer conduit 60. The pivots 70 are connected at their lower ends to the weights 56 and at their upper end to depending flanges 74 formed integrally with the outer conduit 60. In this manner, the upper ends of the flexure pivots 70 are rigidly connected to the inlet and outlet ducts 24 and 42 through the housing 60 and plate 62, while the lower ends of the pivots are fixed to the sensing conduit 34. Thus, the pivots 70 furnish rigidity to the system by limiting movement of the sensing conduit 34 relative to the inlet and outlet ducts 24 and 42. With the cooperation of other structure which will be described below, the flexure pivots 70 limit the deflection of the sensing conduit 34 about the torque axis to approximately ¼ degree.

The use of the flexure pivots 70 across the bellows 52 and 54 in the manner described appreciably enhances the accuracy of the meter. This may best be demonstrated by describing the deflection of the bellows. As the sensing conduit 34 deflects under the influence of a gyroscopic torque, the axes of the bellows bend, with a major portion of each bellows being displaced to one side of its original axis, in or out with respect to the plane of the drawings. Therefore, the pressure of the fluid flowing through the bellows exerts unequal forces on each side of the axis in the manner of a Bourdon tube. If the torque axis of the instrument is fixed along a line intersecting the original bellows axes, the pressure of the fluid creates a torque which either adds to or subtracts from the gyroscopic torque, destroying the linear relationship between deflection and the mass flow rate. However, the reduced central portions 72 of the flexure pivots 70 which define the torque axis react to deflection of the sensing conduit 34 in substantially the same manner as the bellows, that is, they assume approximately the same curvature as the bellows axes. As a result, the torque axis displaces with the displacement of the bellows axis to maintain equal portions of the bellows on each side of the torque axis and thereby counteracts the Bourdon effect. In this manner, pressure sensitivity is effectively eliminated. By allowing a portion of the fluid flowing through the meter to flow through the port 61 to fill the annular chamber between the outer conduit 60 and the sensing conduit 34 and the bellows 52 and 54, the pressures against the inner and outer surfaces of the walls of the bellows are equalized and fluids under extremely high pressures may be handled without damaging the bellows. Because the passage 61 comprises the only means for fluid to enter or leave the annular chamber, fluid is not permitted to bypass the sensing conduit 34. As a result, measurement of all of the fluid passing through the instrument is assured. In addition, the housing 60 offers physical protection to the instrument, and it also serves to eliminate pressure sensitivity. Because the pressure of the fluid within the bellows equals that of the fluid in the annular chamber, no net force is exerted on the bellows to add to or subtract from the gyroscopic torque. In the absence of the flexure pivots 70, this becomes extremely important.

To measure the deflection of the sensing conduit 34 about the torque axis, we employ a dynamo transformer 76 of the type disclosed in the patent of Mueller, No. 2,488,734, issued November 22, 1949. The details of this instrument form no part of this invention, and, therefore, will not be described in great detail. The transformer 76 is mounted by its casing directly on the enlarged end 62 of the outer conduit 60. A torque tube 78 coaxial with the torque axis is secured at one end to the weight 56 and has its other end secured to the transformer casing. The torque tube 78 serves to limit deflection of the sensing conduit 34 along with the flexure pivots 70. A rod 80 within the torque tube 78 interconnects the weight 56 and the rotor of the transformer 76. While the transformer casing and the stator are fixed with respect to the inlet and outlet ducts 24 and 42, the transformer rotor may be moved relative to those elements by virtue of its direct connection to the weight 56 which deflects with the sensing conduit 34. The transformer 76 produces a signal in response to the displacement of its rotor relative to the stator directly proportional to the torque exerted on the sensing conduit 34 by the fluid. Four wires 82 through a cable 84 connect the transformer to a slip ring assembly 86 mounted on the outlet duct 42 immediately above the base 10. Two of the wires energize the transformer 76 and the other wires carry the signal produced by the transformer in response to the deflection of its rotor. A constant A.C. current source is employed to energize the transformer 76 and a rate meter which may take the form of a voltmeter is connected to the output side of the transformer for measuring the signal prdouced by it. A linear voltmeter scale calibrated in pounds or slugs per seconds will indicate the instantaneous mass rate of flow through the instrument. To record total flow we provide a watt-hour meter calibrated in slugs or pounds, connected in parallel with the rate meter and supplied with the constant A.C. current. The details of these instruments form no part of our invention and, therefore, are shown only in block form in the drawing.

Our flowmeter operates typically as follows: Pipes 20 and 22 are connected in the line carrying fluid whose mass flow is to be measured. The constant speed motor 88 through its gear 90 and the gear 92 rotates the sensing conduit 34, the inlet and outlet ducts 24 and 42, the plate 64, and the outer conduit 60 on the base 10 about the drive axis. Fluid enters the base 10 by the pipe 20 and flows up through the inlet duct 24, the sensing conduit 34 and returns to the line through the outlet duct 42, the chamber 14 and the pipe 22. Part of the fluid introduced into the meter bleeds through the passage 61 and fills the annular chamber defined by the outer conduit 60 and the sensing conduit 34, thus equalizing the pressures exerted on each of the bellows 52 and 54. The sensing conduit 34 deflects within the outer conduit 60 about the torque axis under the influence of the gyroscopic torque created by the spinning sensing conduit 34 and the angular momentum of the fluid within the sensing conduit. The dynamo transformer 76 responds to the deflection of the sensing conduit 34 and produces a signal directly proportional to the angular deflection, which in turn is directly proportional to the torque. The rate meter indicates the instantaneous mass flow of the fluid and total flow is recorded on the watt-hour meter.

In Fig. 3 we have illustrated in cross-section an alternative form of sensing conduit which has particular advantages when the mass flow rate of heterogeneous fluids is measured. The sensing conduit 100 within the outer conduit 102 is of reduced radial width relative to the drive axis and serves to stabilize the effective radius of the rotating mass. This may best be demonstrated by considering the effects of rotation of the sensing conduit 34 on a mixture of air and water being measured. Under the influence of centrifugal force, the water separates from the air and moves to the outside of the sensing conduit relative to the drive axis, and increases the effective radius of the spinning mass. Because the torque produced by the meter is a function of the effective radius of the spinning mass, it is necessary to maintain that radius at as nearly as possible a constant value to preserve the linearity between deflection and mass flow rate. By reducing the radial width of the sensing conduit, the effective radius cannot vary appreciably.

Having described in great detail one embodiment of our invention, its numerous advantages will be apparent to those skilled in the art. Pressure sensitivity is eliminated by surrounding the bellows 52 and 54 by a pressurized chamber. Because the meter rotates about a vertical axis, gravity sensitivity is eliminated. The center of gravity of the sensing conduit mass lies reasonably close to the torque axis by virtue of the weights 56. Since deflection of the sensing conduit is limited to a maximum of ¼ degree, the center of gravity of the mass may not shift an appreciable distance from the plane of the torque and drive axis, and, therefore, the additional torque about the torque axis created by the displacement of the sensing conduit is negligible. Other advantages of our meter are worthy of note. For example, the simple configuration of the inlet, outlet, and sensing conduits makes the meter relatively easy to build.

From the foregoing discription those skilled in the art will appreciate that a number of modifications of the meter illustrated may be made without departing from the spirit of this invention. The bellows 52 and 54 may be replaced by any suitable means which allows the sensing conduit 34 to deflect relative to the inlet and outlet ducts 24 and 42. When the outer conduit 60 which reduces pressure sensitivity is incorporated into the meter, it is only necessary for pivots 70 to provide a flexible coupling for the sensing conduit. If desirable, other flexible couplings may be employed, and the deflection of the sensing conduit may be limited by the torque tube 78 alone. Therefore, it is not intended that this invention be limited to the embodiment illustrated and described but that its scope be determined by the appended claims and their equivalents.

What we claim as new and desire to secure by Letters Patent of the United States is:

1. A flowmeter comprising a base, an inlet duct extending upwardly from the base and having upper and lower vertical portions, the upper portion of the inlet duct being displaced to one side of the axis of said lower vertical portion of the duct, a curved sensing conduit having a vertical inlet leg connected to the upper end of the inlet duct, the curved sensing conduit having a vertical outlet leg parallel to the inlet leg and disposed on the same side of the axis of the lower portion of the inlet duct as the inlet leg, said sensing conduit having a horizontal leg interconnecting the vertical legs, an outlet duct connected to the second vertical leg, means angularly moving the sensing conduit about the axis of the lower portion of the inlet duct, means supporting the sensing duct for angular deflection about an axis perpendicular to both the axis of angular movement and an axis about which there exists angular momentum of the fluid in the sensing conduit, and indicating means responsive to angular deflection of the sensing conduit.

2. A flowmeter as defined in claim 1 further characterized by a flexure pivot connecting the sensing conduit with at least one of the ducts limiting angular deflection of the sensing conduit to ¼ degree under full flow conditions.

References Cited in the file of this patent
UNITED STATES PATENTS

| | | |
|---|---|---|
| 1,401,299 | Wohlenberg | Dec. 27, 1921 |
| 2,402,224 | Hornbostel | June 18, 1946 |
| 2,624,198 | Pearson | Jan. 6, 1953 |
| 2,865,201 | Roth | Dec. 23, 1958 |

FOREIGN PATENTS

| | | |
|---|---|---|
| 8,454 | Great Britain | 1901 |